May 9, 1967 — F. W. WAKEFIELD — 3,318,743
METHOD OF MAKING ELECTRIC CABLES
Filed March 23, 1965 — 2 Sheets-Sheet 1

INVENTOR.
FREDERICK W. WAKEFIELD
By Donald G. Dalton
Attorney

May 9, 1967 F. W. WAKEFIELD 3,318,743
METHOD OF MAKING ELECTRIC CABLES
Filed March 23, 1965 2 Sheets-Sheet 2
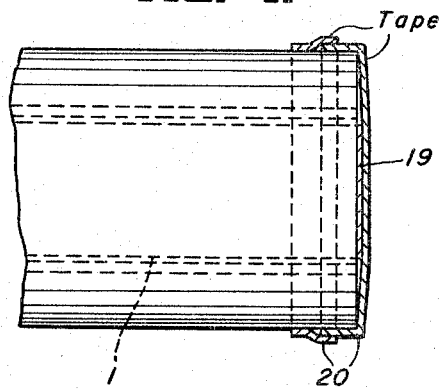
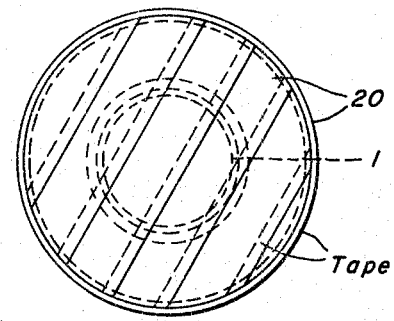
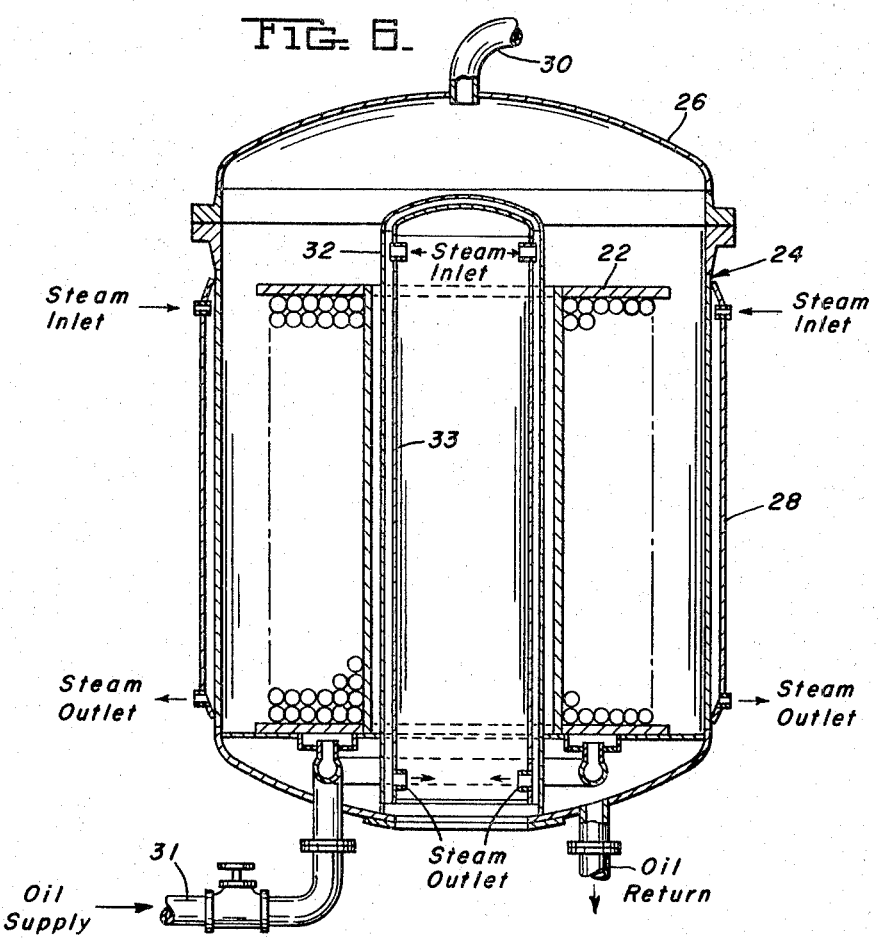
INVENTOR.
FREDERICK W. WAKEFIELD
By Donald G. Dalton
Attorney United States Patent Office 3,318,743
Patented May 9, 1967

3,318,743
METHOD OF MAKING ELECTRIC CABLES
Frederick W. Wakefield, Northboro, Mass., assignor to United States Steel Corporation, a corporation of Delaware
Filed Mar. 23, 1965, Ser. No. 441,992
7 Claims. (Cl. 156—48)

This application is a continuation-in-part of my co-pending application Ser. No. 203,168 filed June 18, 1962, now Patent No. 3,211,821 dated Oct. 12, 1965, which is a continuation-in-part of my abandoned application Ser. No. 64,852 filed Oct. 25, 1960, which in turn is a continuation-in-part of my abandoned application Ser. No. 803,940 filed Apr. 3, 1959. This invention relates to a method of making an electric cable and more particularly to an oil impregnated solid type metal covered power cable. Such cables have been extensively used for a long time and have the advantages of having low losses and being relatively cheap to manufacture. However, they have certain disadvantages which reduce their service life. The saturating oil completely permeates the paper insulation and stranded copper conductor with a chemical reaction taking place between the saturating oil and the copper conductor which adversely affects the electrical properties of the saturating oil. When the cable transmits power the copper conductor becomes hot, thus accelerating the chemical reaction and causing the deteriorated oil to migrate into the paper insulation. This condition is especially bad because the paper insulation nearest the conductor is most affected, this being the position where the voltage stress across the insulation is maximum.

When a solid type paper cable is installed on an incline the saturating oil migrates, by gravity, from the high points to the low points. Most of this migration takes place through the spaces in the stranded conductor, which is the hottest part of the cable during load cycles and where the resistance to axial flow is less. The dry paper insulation at the cable high spots result in ionization and hot spots which eventually lead to a voltage failure caused by thermal instability.

When a solid type paper cable is heated, the increase in volume due to the expansion of the lead covering is much less than the volume increase of the saturating oil, with the result that high pressure builds up inside the cable. This internal pressure is sufficient to cause permanent expansion of the lead covering or sheath. During periods of light load the cable cools off and the saturating oil contracts, thus causing very low pressure gas voids inside the cable. Severe ionization takes place in these low pressure voids and usually starts a tracking type failure near the conductor where the volts per mil stress is the highest. Once the first few tapes near the conductor have been punctured it is easier for the carbon track to continue through the insulation and cause a voltage failure.

In some instances a layer or layers of various types of material have been used between the conductors and the paper insulation, but these materials have not been satisfactory for various reasons. The material may not be impervious to the oil so that the oil will migrate into the conductor, the material may not be oil resistant so that it will contaminate the oil and raise its power factor, and/or the material may not be sufficiently resilient to prevent the formation of low pressure voids in the paper insulation.

The common method of making these cables is to assemble the cable, except for the outer sheath, and then place the assembly in an oil saturating tank where heat and vacuum are applied to remove moisture from the assembly. The paper insulation is then saturated with oil. However, saturating oil will get into the conductors during this operation with the disadvantages pointed out above.

In order to overcome some of these difficulties oil filled cables have been provided, but these require oil reservoirs at frequent intervals and require gas supply apparatus which must be maintained and supervised. Also pressure is usually applied to the outside of the cable insulation. Even after draining the cable core at an elevated temperature there is usually enough saturant remaining in the insulation to gather in the pressure tubes and follow to the lowest point of the installed cable. Once the pressure tubes are filled for a considerable distance with the viscous saturant it is difficult for pressure compensation to take place, especially during light cable loads when it is most required to prevent tracking. Manufacturing cost is high and in case of gas pressure failure damage may occur due to tracking before before the leak can be repaired.

It is therefore an object of my invention to provide a method of making an oil impregnated insulated cable which eliminates or greatly reduces the aforementioned disadvantages.

This and other objects will be more apparent after referring to the following specification and attached drawings, in which:

FIGURE 4 is a schematic longitudinal view of the cable showing one step in my method;

FIGURE 5 is an end view of FIGURE 4; and

FIGURE 6 is a schematic sectional view of apparatus used in the practice of my invention.

Figure 1:
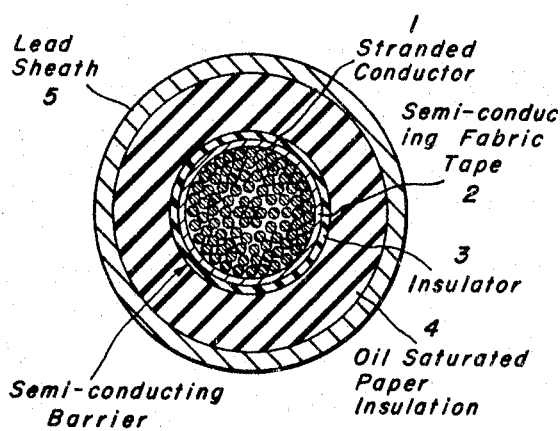
FIGURE 1 is a cross section of a preferred embodiment of the cable of my invention.

Referring more particularly to FIGURE 1 of the drawings, reference numeral 1 indicates a conductor which is preferably stranded copper wire. A resilient oil impervious and oil resistant semi-conducting barrier is provided around the conductor 1. As shown in FIGURE 1 this barrier includes a semi-conducting fabric tape 2 adjacent the conductor 1 and an insulating layer 3 around the fabric tape 2. The insulator 3 is preferably irradiated polyethylene, but may be polyethylene cross-linked chemically or by some other means. Oil impregnated paper insulation 4 surrounds the layer 3 and a lead sheath 5 surrounds the insulation 4. The materials of layer 3 are oil resistant, relatively impermeable to air and oil, and able to withstand temperatures of at least approximately 115° C. without substantial deterioration. Other physical properties are as follows:

| Properties: | Irradiated polyethylene |
|---|---|
| Percent power factor—60 cycles | 0.05. |
| S.I. C 60 cycles | 2.3. |
| Electric strength volts per mil | 1800. |
| Volume resistivity ohm-cm | $10^{15}$. |
| Moisture resistance | Good. |

The oil is that commonly used in electric cables. One particular type often used is Sun Oil's XX Heavy Cable Impregnating Oil which is a mineral oil having the following properties:

| Gravity API/60° F. | 21.2. |
|---|---|
| Flash ° F. | 470. |
| Fire ° F. | 550. |
| S.U. viscosity at 210° F. | 101.9. |
| Pour test ° F. | —5. |

| | |
|---|---|
| Color ASTM D-155 | 2¼. |
| Color ASTM D-1500 | L2.5. |
| Neut. No. | Neutral. |
| Demulsibility | Good. |
| Emulsibility | Good. |
| Brightness | Bright. |
| Initial percent power factor at 100° C. | 0.37. |

Of the above properties the viscosity and the initial percent power factor are the most significant. To prevent undue migration of the oil the viscosity should not be below 80 and for manufacturing reasons the viscosity should not exceed 1000. This is true of all impregnating oils used in solid type impregnated paper cable.

In making the cable according to my invention it is preferred that the layers 2 and 3 be applied in tape form. The paper insulation 4 is then applied in the usual manner. The ends of the stranded conductor 1 are sealed with solder 19 and the entire cross-section of the cable ends are sealed with oil resistant tape 20 as shown in FIGURES 4 and 5. Alternately the sealing may be done by means of liquid epoxy resin. At this time the barrier is not air or oil impervious.

The assembly is placed on a reel 22. After the ends of the assembly are sealed as stated above, the reel 22 with the partially completed cable thereon is placed in a saturating tank 24. The tank 24 includes a cover 26 and steam jacket 28 with a conduit 30 attached to cover 26 and an oil conduit 31 attached to the bottom of the tank. A post 32 having a steam jacket 33 is provided in the tank 24 for receiving the reel 22. The cover 26 is closed and a vacuum of 1,000 microns of mercury or less applied through conduit 30. Steam is also supplied to the steam jackets 28 and 33 to raise the temperature within the tank 24 to 225° F. or more. Preferably the temperature will not exceed 248° F. This temperature is maintained for a period of time which is generally between 12 and 80 hrs., depending upon the thickness of the insulation. During this time several things take place. The moisture is removed from the assembly through the end seals, barrier and insulation and the layers 2 and 3 are bonded together to make an oil impervious barrier. During the initial part of the heating step moisture in the conductors is vaporized and passes through the barrier into the insulation. The moisture also passes from the assembly around the end seals and through the paper insulation. This continues until after the temperature of the barrier reaches approximately 225° F. At this temperature the polyethylene starts to soften and the tape attempts to shrink the amount it was stretched during manufacture. Because the polyethylene tape is soft and the pressure between the tape surfaces is high due to tape shrinkage, complete heat sealing takes place at the tape interface and forms an air and oil impervious barrier at this time. Removal of moisture from the insulation continues during the remainder of the heating step. Saturating oil is then introduced into the tank through conduit 31. A temperature above 200° F. and generally between 215° and 230° F. is maintained as in the usual saturating practice. The cable is preferably so positioned that its ends are above the oil level in the tank 24 so that the amount of oil contacting the cable ends is kept at a minimum and is generally limited to that caused by splashing of the oil. The saturation takes approximately the same time as the drying operation. Thus, by this process, oil is prevented from entering the stranded conductor 1 by reason of the end seals and barrier. After completing the oil saturation process the assembly is allowed to cool and the lead sheath 5 immediately applied to complete the cable.

Since the saturating oil does not contact the conductor 1 there can be no chemical action between the saturating oil and the copper. Since the oil in the conductor is eliminated, less than normal expansion of the lead sheath will occur during heat cycles. When the cable cools off the air entrapped in the conductor 1 will expand and prevent any very low pressure voids from forming in the paper insulation 4, especially near the conductor 1. When the saturating oil expands, the resilient barriers 2 and 3 will be forced into the interstices of the stranded conductor and when the saturating oil contracts the air pressure in the conductor will force the barrier back, thus providing a pressure compensating effect. Since the oil can move only within the paper insulation, less migration of saturating oil will occur. Other solids may be used in place of the paper.

When the barrier is made in the manner described above, using irradiated polyethylene, tests have proved that the normal rate of oxidation of the oil is not increased at elevated temperatures and hence there is little or no effect on the power factor. The life of such cable is approximately 2½ times the life of ordinary solid type cable.

Figure 2:
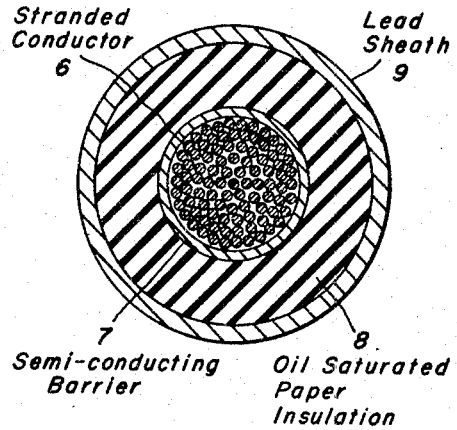
FIGURE 2 is a view, similar to FIGURE 1, showing a second embodiment of my invention.

In the embodiment shown in FIGURE 2 a stranded conductor 6 is surrounded by a resilient oil impervious and oil resistant semi-conducting barrier 7 which is preferably irradiated polyethylene made semi-conducting by adding carbon particles thereto. Oil impregnated paper insulation 8 surrounds the barrier 7 and a lead sheath 9 surrounds the insulation 8. This cable is made in essentially the same manner and will function in essentially the same manner as the cable of FIGURE 1. As in the first embodiment the barrier 7 is made oil impervious during the drying operation.

Figure 3:
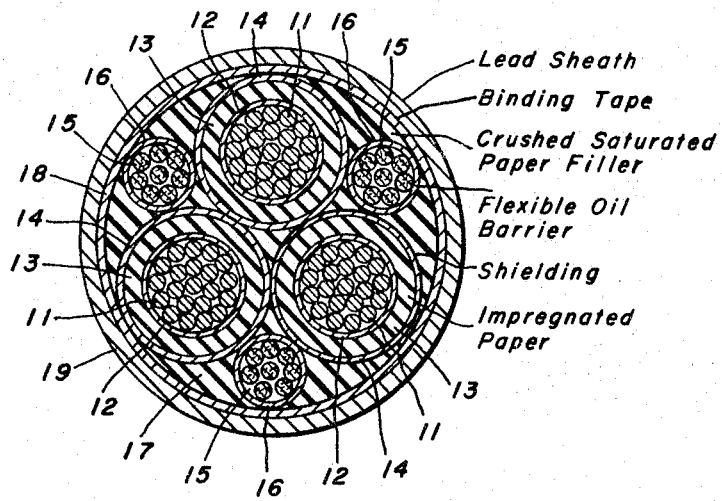
FIGURE 3 is a cross sectional view of a multi conductor cable utilizing my invention.

In the embodiment shown in FIGURE 3 three spaced apart electrical conductors 11 are provided. A resilient oil impervious and oil resistant semi-conducting barrier 12 surrounds each conductor and oil impregnated paper insulation 13 surrounds the barrier 12. The members 11, 12 and 13 are essentially the same as the corresponding members in FIGURES 1 and 2. Shielding 14 surrounds the insulation 13. A plurality of stranded members 15 are arranged in the valleys between the conductors 11 on the outside of the insulating material 13 and the shielding 14. The stranded members 15 may be metallic ground wires, but are preferably non-metallic material such as manila rope which can be deformed under pressure. A barrier 16 of the same type as barrier 12 is arranged around each stranded member 15. Crushed oil saturated paper filler 17 fills the voids between shielding 14 and barriers 16. Binding tape 18 is arranged over the entire assembly beneath a lead sheath 19.

In making the cable of FIGURE 3 the barrier 12 is applied in the manner set forth above and will bond to the paper insulation 13, but not to the conductor 11. The paper insulation 13 is applied in the usual manner and the shielding 14, which is preferably copper tape, is applied at the same time as the paper. The insulated conductors are then stranded together and the covered members 15 positioned between the insulated conductors 11 as shown. The crushed paper fillers are then applied according to standard practice and the metallic binder tape 18 applied overall. The cable is then positioned in the saturating tank with the cable ends sealed with a material, such as an epoxy resin or oil resistant tape as in the first embodiment, and positioned with its ends above the oil level in the saturating tank. The cable is vacuum dried at a temperature between 225 and 248° F. which, as in the first embodiment, heat seals the polyethylene around the stranded conductors 11 and around the stranded members 15. The hot saturating oil is excluded from the conductors 11 and members 15 by means of the oil barriers 12 and 16 and end seals. The entrapped air in the conductor strands compensates for pressure changes on the inside area of the cable insulation and the entrapped air in the stranded members 16 compensates for pressure changes occurring on the outside area of the cable insulation. The members 15 should be as large as possible. If the members 15 are manila rope the cable pressure will be reduced by the rope assuming an elliptical shape so as to reduce its cross sectional area. Thus, the barriers 12 and 16 are forced into the outside surface depressions of members 11 and 15 due to increasing internal cable pressure caused by the saturating oil, especially when it is heated. When the saturating oil cools and contracts, the entrapped air in members 11 and 15 will expand barriers 12 and 16, respectively, and thus tend to adjust the oil-paper volume within the sheath 19. No excessive strain will be exerted on the lead sheath 19 because the barriers 12 and 16 will change their volumes at much lower pressures than the lead sheath 19. The cable pressure and vacuum peaks are also at a minimum because the oil is excluded from the members 11 and 15 so that there is less saturant per unit length in the cable than that normally present.

Ordinarily, most saturant migration due to gravity takes place inside the copper strand and since no oil is present in the copper strands saturant migration is greatly reduced. Also, there is no contact of the oil with the copper which acts as a catalyst to aid deterioration of the oil.

While several embodiments of my invention have been shown and described, it will be apparent that other adaptations and modifications may be made without departing from the scope of the following claims.

I claim:

1. The method of making an electric cable which comprises providing a stranded electrical conductor, applying a resilient oil resistant barrier material in tape form around said conductor over the length thereof, said barrier being capable of being made oil impervious under heat and vacuum, applying a solid impregnable insulating material around said barrier over the length thereof, sealing the ends of the assembly of conductor, barrier and insulating material, subjecting said assembly to sufficient heat and vacuum to remove moisture therefrom and to make the barrier oil impervious, then exposing the assembly with its ends sealed to saturating oil until the insulating material is saturated with oil, and then applying an outer sheath around said insulating material.

2. The method of claim 1 in which said sealing step includes sealing the ends of the conductor with solder, and then placing a plastic seal over the ends of the assembly of conductor, barrier and insulating material.

3. The method of claim 1 in which said barrier material is of the class consisting of irradiated polyethylene and cross-linked polyethylene, and said insulating material is paper.

4. The method of claim 3 in which said sealing step includes sealing the ends of the conductor with solder, and then placing a seal over the ends of the assembly of conductor, barrier and paper.

5. The method of making an electric cable which comprises providing a plurality of stranded electrical conductors, applying in tape form a resilient oil resistant semi-conducting barrier including a compound of the class consisting of irradiated polyethylene and cross-linked polyethylene around each of said conductors over the length thereof, applying paper around each of said barriers over the length thereof, stranding the insulated conductors together with a valley between adjacent insulated conductors, positioning a stranded member with a resilient oil resistant semi-conducting barrier in tape form around said last named stranded member in each valley between the insulated conductors, said barrier including a compound of the class consisting of irradiated polyethylene and cross-linked polyethylene, sealing the ends of the assembly of conductors, barriers, paper and stranded members, subjecting said assembly to sufficient heat and vacuum to remove moisture therefrom and to make the barriers oil impervious, then applying oil to the assembly with the ends sealed until the paper is saturated with the oil, and then applying an outer sheath around the periphery of said assembly.

6. The method of making an electric cable which comprises providing a stranded electrical conductor, applying in tape form a resilient oil resistant semi-conducting barrier including a compound of the class consisting of irradiated polyethylene and cross-linked polyethylene around said conductor over the length thereof, applying paper around said barrier over the length thereof, sealing the ends of the conductor with solder, placing a seal over the ends of the assembly of conductor, barrier and paper, placing the assembly on a reel, placing the reel with its axis vertical in an oil saturating tank without oil therein and with the ends of the assembly above the normal level of the oil, then subjecting the tank to a vacuum and a temperature between 225 and 248° F., maintaining this temperature and vacuum for sufficient time to remove moisture from the assembly and to make the barrier oil impervious around the conductor, then supplying oil to the saturating tank with the ends of the assembly above the top of the oil, maintaining the oil in the tank at a temperature above 200° F. until the paper is saturated with the oil, and then applying an outer sheath around said paper.

7. The method of making an electric cable which comprises providing a plurality of stranded electrical conductors, applying in tape form a resilient oil resistant semi-conducting barrier including a compound of the class consisting of irradiated polyethylene and cross-linked polyethylene around each of said conductors over the length thereof, applying paper around each of said barriers over the length thereof, stranding the insulated conductors together with a valley between adjacent conductors, positioning a stranded member with a resilient oil impervious and oil resistant semi-conducting barrier including a compound of the class consisting of irradiated polyethylene and cross-linked polyethylene therearound in each valley between the insulated conductors, applying metallic binder tape around the entire assembly, sealing the ends of the conductors with solder, then placing a seal over the ends of the assembly, placing the assembly on a reel, placing the reel in an oil saturating tank without oil therein and with the ends of the assembly above the normal level of the oil, then subjecting the tank to a vacuum and a temperature between 225 and 248° F., maintaining this temperature and vacuum for sufficient time to remove moisture from the assembly and to make the barrier oil impervious around the conductors and stranded members, then supplying oil to the saturating tank with the ends of the assembly above the top of the oil, maintaining the oil in the tank at a temperature above 200° F. until the paper is saturated with the oil, and then applying an outer sheath around said assembly.

References Cited by the Examiner

UNITED STATES PATENTS

| | | | |
|---|---|---|---|
| 2,019,297 | 10/1935 | Faucett | 174—102 |
| 2,531,156 | 11/1950 | Piercy et al. | 156—48 |
| 2,621,703 | 12/1953 | Morrison | 156—51 |
| 2,929,744 | 3/1960 | Mathes et al. | 174—110 |
| 3,013,912 | 12/1961 | Priaroggia et al. | 156—51 X |

FOREIGN PATENTS

| | | |
|---|---|---|
| 450,805 | 7/1936 | Great Britain. |
| 570,380 | 7/1945 | Great Britain. |

EARL M. BERGERT, *Primary Examiner.*

J. MATHEWS, T. R. SAVOIE, *Assistant Examiners.*